United States Patent [19]

Theodore

[11] Patent Number: 4,566,728
[45] Date of Patent: Jan. 28, 1986

[54] HATCHBACK VEHICLE BODY INCLUDING HATCH HAVING OPENING WITH SOFT TOP CONVERTIBLE CLOSURE

[75] Inventor: Chris P. Theodore, Whitmore Lake, Mich.

[73] Assignee: Cars & Concepts, Inc., Brighton, Mich.

[21] Appl. No.: 630,703

[22] Filed: Jul. 13, 1984

[51] Int. Cl.⁴ .............................................. B62D 25/00
[52] U.S. Cl. ...................................... 296/76; 296/146
[58] Field of Search .................... 296/76, 107, 37.16, 296/146

[56] References Cited

U.S. PATENT DOCUMENTS 3,909,060 9/1975 Katayama ............................ 296/76

OTHER PUBLICATIONS

Motor Trend Magazine, Feb., 1980 issue, four page article by Ro McGonegal.

*Primary Examiner*—Robert R. Song
*Attorney, Agent, or Firm*—Brooks & Kushman

[57] ABSTRACT

A vehicle body hatchback (12) is disclosed as including a hatch (16) that is movable between open and closed positions and has a hatch opening (24) with a soft top convertible closure (26) movable between open and closed positions with respect to the hatch opening (24). The convertible closure (26) includes a frame (28) movable between raised and stored positions and also includes a soft top (30) that is moved between the closed and open positions thereof upon movement of the frame between the raised and stored positions. Frame (28) of the convertible closure (26) preferably includes a main bow (34) having opposite ends (36) pivotally mounted on the hatch and also includes an auxiliary bow (54) having opposite ends (56) pivotally mounted on the main bow. Movement of the frame bows (34,54) between the stored and raised positions moves the soft top (30) between the closed and open positions. In the closed position, the auxiliary bow (54) is movable to an overcenter position that tensions the soft top (30). In the open position, a storage member (64) mounted on the hatch (16) below its opening (24) supports the soft top (30) and a boot (66) covers the stored convertible closure.

8 Claims, 5 Drawing Figures

HATCHBACK VEHICLE BODY INCLUDING HATCH HAVING OPENING WITH SOFT TOP CONVERTIBLE CLOSURE

TECHNICAL FIELD

This invention relates to hatchback vehicle bodies and, more specifically, to a hatchback vehicle body including a soft top convertible closure.

BACKGROUND ART

The conventional construction of hatchback vehicle bodies includes a rear hatchback with a rear hatch that is mounted for movement between open and closed positions with respect to a rear opening in the vehicle body. Hinges are conventionally mounted at a forward end of the opening in the vehicle body and support the hatch for movement about a horizontal axis between the open and closed positions. Normally, a fixed glass window is provided in the hatch to permit the driver and any passengers to view the area to the rear of the vehicle body through the conventional rearview mirror or otherwise.

Different types of top closures have previously been utilized with vehicle bodies to selectively permit opening of the passenger compartment top to the environment when desired. For example, convertible type vehicles include a soft top closure having a frame that is moved between raised and stored positions and a soft top that is moved by the frame between open and closed positions. Such convertible soft top closures conventionally extend between the rear of the vehicle passenger compartment and the front windshield header in the closed position and are stored to the rear of the passenger compartment in the open position where the top of the passenger compartment is exposed.

Convertible soft top closures have been replaced to a large extent in domestically manufactured vehicles by hard top closures of the single panel or the dual panel T-top type. With a single panel top, a single removable roof panel extends between the windshield header and a rear roof portion in the closed position and is removed to expose the top of the passenger compartment to the environment. A pair of roof panels are utilized with T-tops and are respectively located in the closed position on opposite sides of a central strut that extends longitudinally between the windshield header and a rear roof portion. Suitable latches are utilized to hold the pair of roof panels in the closed position and to selectively permit removal thereof so that the vehicle body has a pair of openings that expose the passenger compartment.

Also, Toyota type vehicles such as disclosed by the February, 1980 issue of Motor Trend magazine has previously utilized a soft top closure for replacing the conventional rear window. In the open position, the soft top closure opens the area normally occupied by the rear window and in the closed position closes that area when necessary or desired for whatever reason.

Rear vehicle windows have also previously been removable without the provision of any soft top closure, such as on the Corvette type vehicle manufactured by General Motors Corporation of Detroit, Mich., United States of America.

DISCLOSURE OF INVENTION

An object of the present invention is to provide an improved hatchback vehicle body including a hatch that is movable between open and closed positions and has an opening that is selectively opened and closed by a soft top convertible closure. This hatch having the soft top convertible closure can be manufactured as an original component of the hatchback vehicle body or as an after market component. Certain purchasers may desire to have a conventional rear hatch with a fixed glass window for use in the wintertime and the to also have the rear hatch of the present invention with its soft top convertible closure for use in the summertime. However, in warmer climates, the rear hatch with the soft top convertible closure of this invention may be sufficient for use throughout the year since closing of the convertible closure isolates the passenger compartment from the environment during periods of inclement weather.

A vehicle body in which the invention is incorporated includes a rear hatchback having a rear vehicle body opening and also having a rear hatch that is mounted for movement between open and closed positions with respect to the rear opening. In accordance with the invention, a hatch opening is provided in the rear hatch and a soft top convertible closure is mounted on the rear hatch for movement between closed and open positions with respect to the opening of the hatch. The convertible closure includes a frame that is movable between raised and stored positions and also includes a soft top that is moved between the closed and open positions thereof upon movement of the frame between the raised and stored positions.

In the preferred construction, the frame of the convertible closure includes a main bow having opposite ends pivotally mounted on the hatch and an intermediate portion extending between its pivotally mounted ends. The hatch opening has side edges adjacent which the ends of the main bow are pivotally mounted on the hatch and also has front and rear edges between which the side edges extend. The soft top has a front edge secured to the intermediate portion of the main bow and has a rear edge secured to the hatch adjacent the rear edge of the opening in the hatch.

An auxiliary bow of the convertible closure frame has opposite ends pivotally mounted on the main bow and also has an intermediate portion extending between its pivotally mounted ends. This intermediate portion of the auxiliary bow has a connection secured to the soft top. Upon movement of the frame to the raised position to position the soft top in the closed position, the auxiliary bow is movable to an overcenter position on the main bow in order to tension the soft top and thereby prevent its flapping in the wind during travel.

Suitable latches are also provided to secure the intermediate portion of the main bow of the frame to the hatch adjacent the front edge of the opening in the hatch in order to hold the convertible closure in the closed position. These latches are released to permit movement of the frame from the raised position to the stored position and concomitant movement of the soft top to the open position. A storage member mounted on the hatch below the opening thereof supports the soft top in this open position.

A boot is also provided for covering a rear portion of the hatch opening with the convertible closure in the open position. Detachable retainers on both the soft top and the boot and on the hatch selectively secure the soft top to the hatch in the closed position and secure the boot to the hatch with the convertible closure in the open position. The securement of the soft top to the hatch in the closed position by the detachable retainers is preferably provided at a flap that extends over the outer surface of the hatch with another portion of the soft top permanently secured at the inner surface of the hatch.

In the preferred construction, the hatch includes inner and outer panel members that cooperatively define the opening of the hatch. The hatch also preferably includes a deck lid that extends rearwardly from the inner and outer panel members.

BEST MODE FOR CARRYING OUT THE INVENTION

Figure 1:
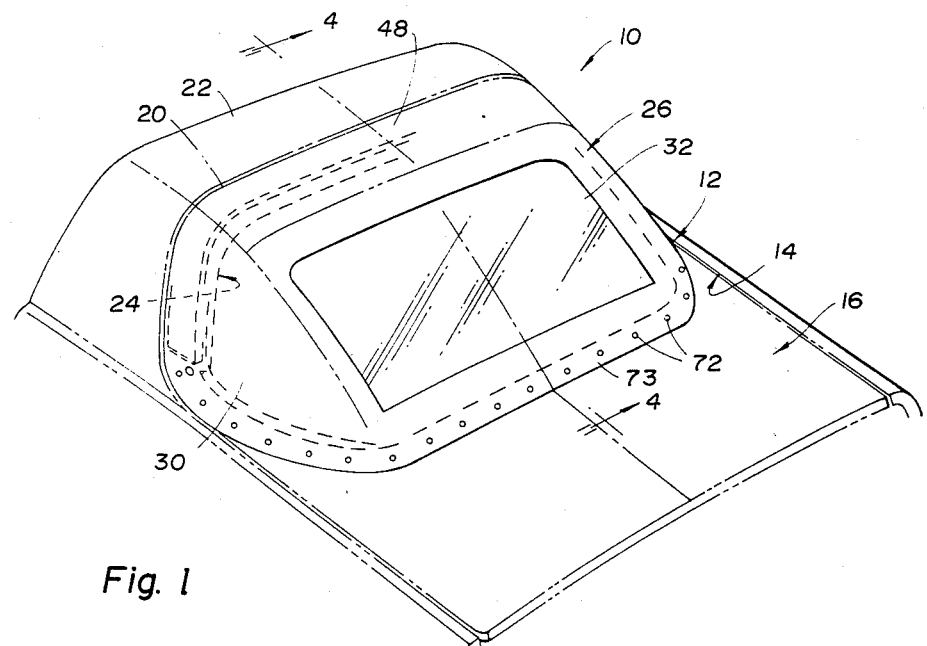
FIG. 1 is a partial perspective view of a hatchback vehicle body that includes a rear hatch having a soft top convertible closure in accordance with the present invention with the convertible closure shown in a closed position.
Figure 2:
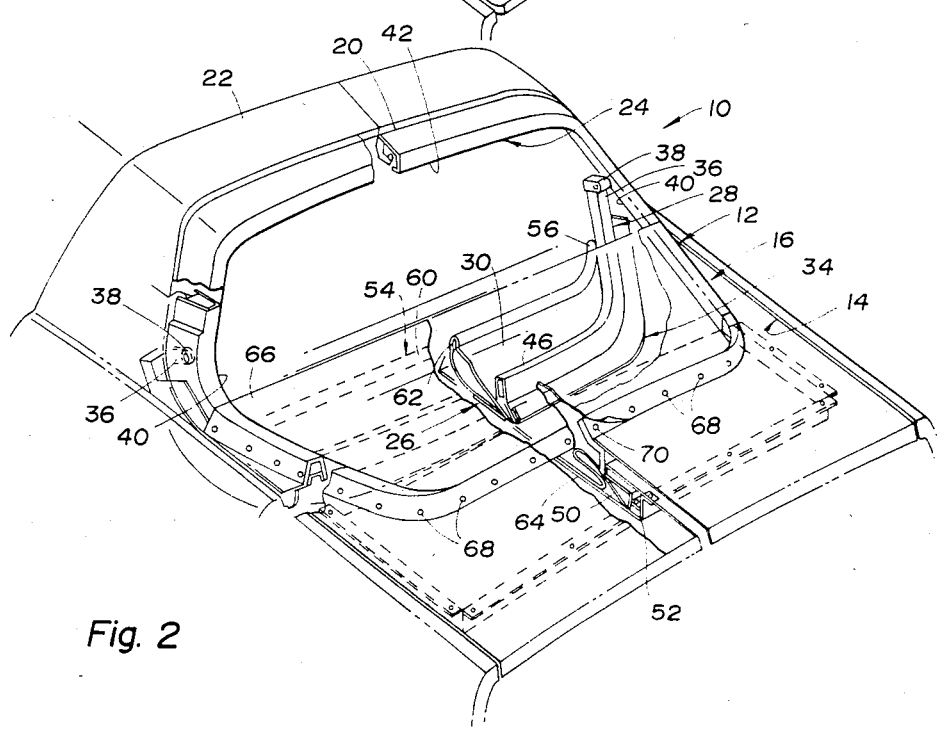
FIG. 2 is a view similar to FIG. 1 but partially broken away and with the convertible closure shown in an open position.
Figure 3:
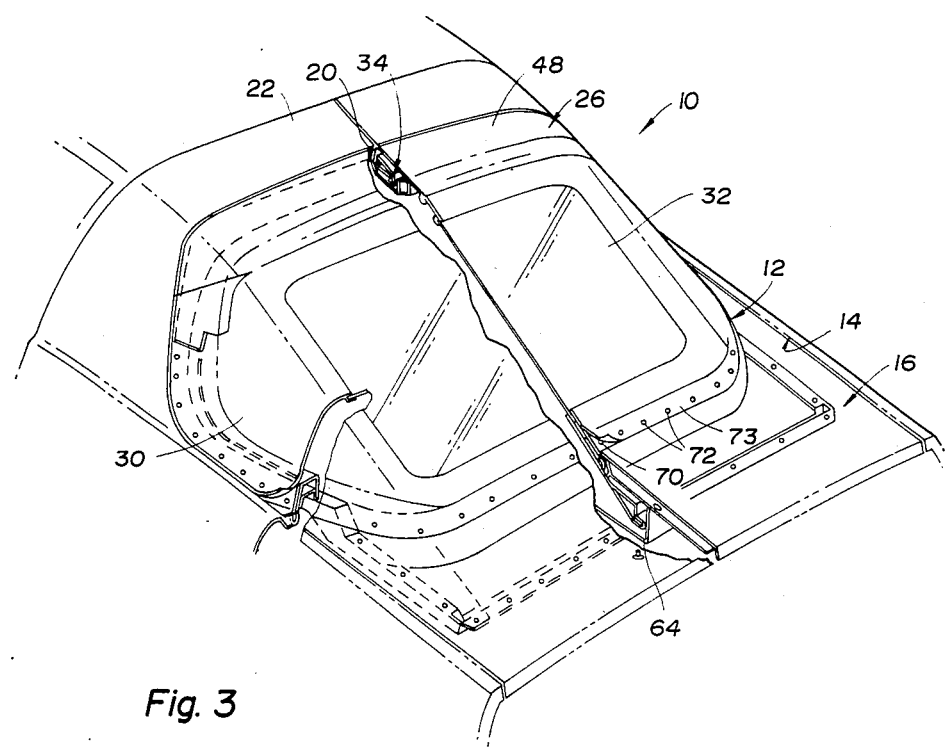
FIG. 3 is a view similar to FIGS. 1 and 2 but with the convertible closure shown in the closed position and partially broken away for purposes of illustration.

With reference to FIGS. 1 and 2 of the drawings, a vehicle body generally indicated by 10 includes a rear hatchback 12 constructed in accordance with the present invention as is hereinafter more fully described. Hatchback 12 includes a rear opening 14 in the vehicle body and a hatch 16 for selectively opening and closing the opening 14. As schematically illustrated in FIGS. 4 and 5, a pair of hinges 18 support a forward edge 20 of the rear hatch 16 on a roof portion 22 to permit pivotal movement of the hatch about a horizontal axis between the closed position shown and an upwardly tilted open position in a conventional manner.

As illustrated in FIG. 2, the rear hatch 16 includes a hatch opening 24 located adjacent the forward end of the hatch. A soft top convertible closure 26 is mounted on the rear hatch 16 for movement between the closed position of FIG. 1 and the open position of FIG. 2 with respect to the hatch opening 24. Convertible closure 26 includes a frame 28 movable between the raised position shown by solid line representation in FIG. 4 and the stored position shown by phantom line representation in FIG. 4. A soft top 30 of the convertible closure is moved between the closed and open positions respectively shown in FIGS. 1 and 2 by the movement of the frame between the raised and stored positions. In the closed position of FIG. 1, the convertible closure 26 closes the hatch opening 24 while a rear window 32 of the soft top 30 permits observation to the rear of the vehicle. Movement of the convertible closure 26 to the open position of FIG. 2 opens the hatch opening 24 to give the vehicle an open construction. Forward of the roof portion 22 on which the hatch 16 is mounted, the vehicle may be provided with a single removable panel or a or T-top construction to further provide opening of the passenger compartment.

It should be appreciated that the rear hatchback 12 of this invention can be provided as an original component of the vehicle or as an after market component. In addition, the hinges 18 that connect the hatch 16 to the vehicle body may be of the detachable type to permit interchanging of a conventional rear hatch with a fixed glass window and the rear hatch 16 of this invention with the soft top convertible closure 26. Thus, a conventional hatch would normally be utilized with the vehicle in wintertime when the weather is colder, while the hatch of this invention would normally be utilized with the vehicle in summertime when the weather is warmer.

Figure 4:
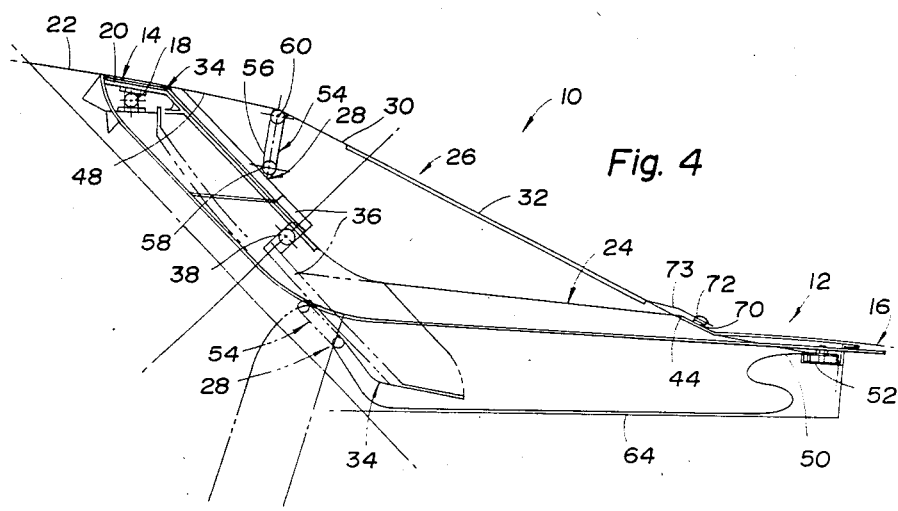
FIG. 4 is a sectional view taken through the convertible closure along the direction of line 4—4 in FIG. 1.
Figure 5:
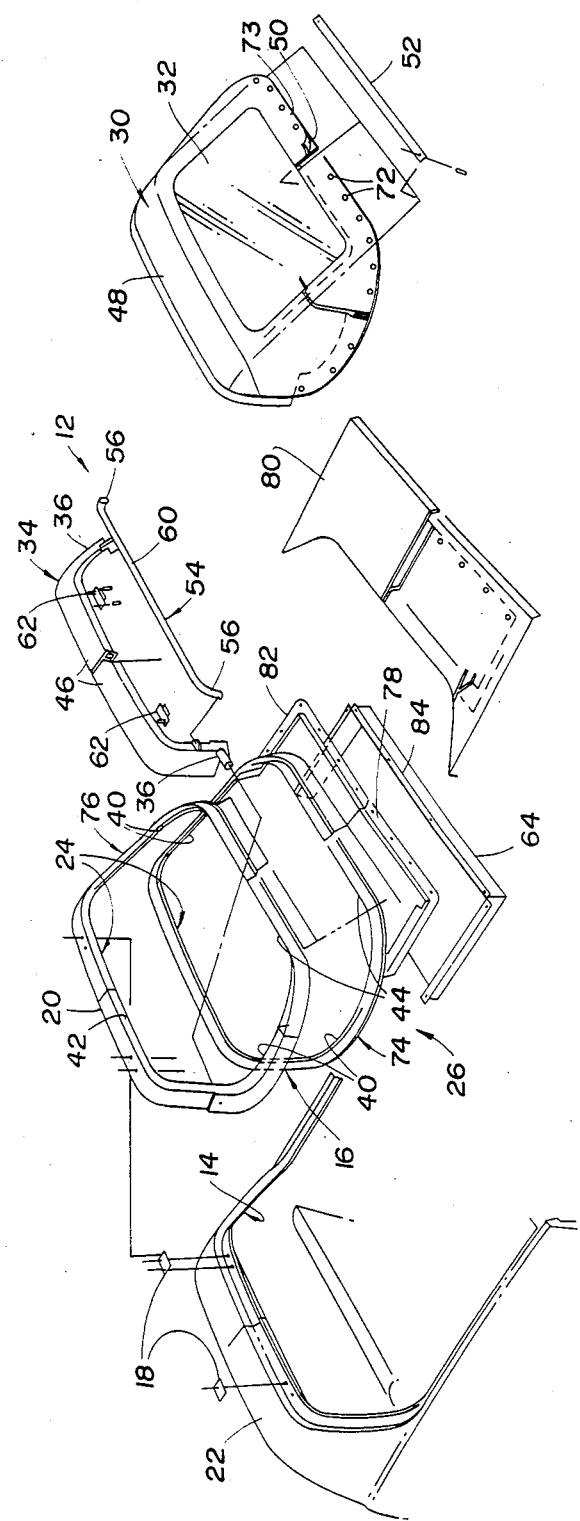
FIG. 5 is an exploded perspective view of the rear hatch and convertible closure.

With reference to FIGS. 2 and 4, the convertible closure frame 28 includes a main bow 34 of a somewhat U-shape having opposite ends 36 supported by pivotal connections 38 on the hatch 16. The rear opening 24 of the hatch 16 has side edges 40 adjacent which the ends 36 of the main bow 34 are pivotally mounted. Hatch opening 24 also includes front and rear edges 42 and 44 (shown respectively in FIGS. 2 and 4) between which the side edges 40 of the hatch opening extend. An intermediate portion 46 of the main bow 34 extends between its opposite ends 36 and is secured in any suitable manner to a front edge 48 of the soft top 30. As illustrated in FIGS. 4 and 5, a rear edge 50 of the soft top 30 is secured by an attachment strip 52 adjacent the rear edge 44 of the hatch opening 24 at the inner side of the hatch. Movement of the frame 28 between the stored and raised positions thus moves the soft top 30 between the closed and open positions as previously described.

As best seen in FIGS. 2 and 4, the convertible closure frame 28 also includes an auxiliary bow 54 with opposite ends 56 having pivotal connections 58 that provide support of the auxiliary bow on the main bow 34 adjacent its opposite ends 36. An intermediate portion 60 of the auxiliary bow 54 extends between its opposite ends 56 and has a stitched connection 62 (FIG. 2) that provides securement thereof to the soft top 30. Upon movement of the convertible closure 26 to the closed position, the auxiliary bow 54 is pivotally moved to an overcenter position on the main bow 34 as illustrated in FIG. 4. In this overcenter position, the intermediate portion 60 of the auxiliary bow 54 is located to the right of a line between the pivotal connection 38 of the main bow to the hatch and the pivotal connection 58 of the auxiliary bow to the main bow. Such positioning of the auxiliary bow tensions the soft top 30 and maintains the auxiliary bow against counterclockwise movement so that the soft top remains tensioned during vehicle travel despite the accompanying vibration.

As illustrated schematically in FIG. 5, a pair of releasable latches 62 are mounted on the intermediate portion 46 of the main bow 34 respectively adjacent its opposite ends 36. These latches 62 are operable to secure the main bow 34 to the forward edge 20 of the hatch in order to hold the convertible closure in the closed position previously described. Latches 62 are released in order to permit the movement of the convertible closure frame from the raised position to the stored position and accompanying movement of the closure to the open position.

As illustrated in FIGS. 4 and 5, a storage member 64 is also provided mounted on the hatch 16 below its opening 24. Clockwise rotation of the main bow 34 from the raised position shown by solid line representation in FIG. 4 to the stored position shown by phantom line representation moves the soft top 30 from the closed position to the open position and stores the soft top on the storage member 64 just below the hatch 16. While the storage member 64 is illustrated as a metal tray, it is understood that other storage members could be utilized such as a soft cloth sling or the like.

With reference to FIG. 2, a boot 66 is also provided for covering a rear portion of the hatch opening 24 with the convertible closure in the open position. This boot 66 extends generally horizontally and leaves open the area normally occupied by the rear window. Boot 66 includes snap type detachable retainers 68 at its rear and side edges for providing securement thereof to detachable retainers 70 on the hatch 16. With the boot removed, detachable snap type retainers 72 on an outer flap 73 of the soft top 30 provides securement of the soft top in its closed position by attachment thereof to the same hatch retainers 70 that are used to secure the boot 66.

As illustrated in FIG. 5, the rear hatch 16 includes inner and outer panel members 74 and 76 that cooperate to define the hatch opening 24 upon securement thereof to each other in any suitable manner such as by welding. Inner panel 74 includes a rearward extension 78 upon which a rear deck lid 80 of the hatch 16 is mounted. A flange 82 that extends around the extension 78 receives suitable connectors such as screws for attaching a peripheral flange 84 of the storage member 64. It will be noted that the extension 78 above the storage member 64 and the deck lid 80 extend generally horizontally in alignment with the rearward portion of the inner and outer panel members 74 and 76. At their forward ends, the inner and outer panel members 74 and 76 extend upwardly to define the normal rear window area which is opened with the convertible closure in the open position and closed with the convertible closure in the closed position.

While the best mode for carrying out the invention has been described, those familiar with the art to which the invention relates will recognize various alternative designs and embodiments for practicing the invention as defined by the following claims.

I claim:

1. In a vehicle body including a rear hatchback having a rear opening in the vehicle body and also having a rear hatch mounted for movement between open and closed positions with respect to the rear opening, the invention comprising: a hatch opening in the rear hatch; said hatch opening having side edges and also having front and rear edges between which the side edges extend; a soft top convertible closure mounted on the rear hatch and movable between closed and open positions with respect to the opening thereof; the convertible closure including a frame movable between raised and stored positions; said frame including a main bow having opposite ends pivotally mounted on the hatch adjacent the side edges of the hatch opening; said frame also including an auxiliary bow having opposite ends pivotally mounted on the main bow; the convertible closure also including a soft top that is moved between the closed and open positions thereof upon movement of the frame between the raised and stored positions; the soft top having a front edge secured to the main bow and having a rear edge secured to the hatch adjacent the rear edge of the opening in the hatch; and a connection that secures the soft top to the auxiliary bow with the auxiliary bow being movable to an overcenter position on the main bow with the frame in the raised position to position the soft top in the closed position.

2. A hatchback vehicle body as in claim 1 further comprising latches for securing the main bow to the hatch adjacent the front edge of the opening in the hatch.

3. A hatchback vehicle body as in claim 1 or 2 further comprising a storage member mounted on the hatch below the opening thereof to support the soft top in the open position.

4. A hatchback vehicle body as in claim 3 further comprising a boot for covering a rear portion of the hatch opening with the convertible closure in the open position.

5. A hatchback vehicle body as in claim 4 further comprising detachable retainers on both the soft top and the boot and on the hatch to selectively secure the soft top to the hatch in the closed position of the convertible closure and to secure the boot to the hatch with the convertible closure in the open position.

6. In a hatchback vehicle body including a rear hatchback having a rear opening in the vehicle body and also having a rear hatch mounted for movement between open and closed positions with respect to the rear opening, the invention comprising: a hatch opening in the rear hatch; the hatch including inner and outer panel members that cooperatively define the opening of the hatch; the hatch also including a rear deck lid that extends rearwardly from the inner and outer panel members; a soft top convertible closure mounted on the rear hatch and movable between closed and open positions with respect to the opening thereof; the convertible closure including a frame movable between raised and stored positions; and the convertible closure also including a soft top that is moved between the closed and open positions thereof upon movement of the frame between the raised and stored positions.

7. In a vehicle body including a rear hatchback having a rear opening in the vehicle body and also having a rear hatch mounted for movement between open and closed positions with respect to the rear opening, the invention comprising: a hatch opening in the rear hatch; the hatch opening having an upper front edge and a lower rear edge and having a pair of side edges extending between the front and rear edges in a spaced relationship to each other; a soft top convertible closure mounted on the rear hatch and movable between closed and open positions with respect to the opening thereof; the convertible closure including a frame movable between raised and stored positions; said frame including a main bow having opposite ends pivotally mounted on the hatch adjacent the side edges of the opening thereof for movement between the raised and stored positions; said frame also including an auxiliary bow having opposite ends pivotally mounted on the main bow; the convertible closure also including a soft top having a front edge secured to the main bow of the frame and a rear edge secured to the hatch adjacent the rear edge of the opening thereof whereby movement of the frame positions the soft top in the open or closed positions; and a connection that secures the soft top to the auxiliary bow with the auxiliary bow being movable to an overcenter position on the main bow with the frame in the raised position to position the soft top in the closed position.

8. In a vehicle body including a rear hatchback having a rear opening in the vehicle body and also having a rear hatch mounted for movement between open and closed positions with respect to the rear opening, the invention comprising: a hatch opening in the rear hatch; the hatch opening having front and rear edges and having a pair of side edges extending between the front and rear edges in a spaced relationship to each other; a soft top convertible closure mounted on the rear hatch and movable between closed and open positions with respect to the opening thereof; the convertible closure including a frame movable between raised and stored positions; said frame including a main bow having opposite ends pivotally mounted on the hatch adjacent the side edges of the opening thereof for movement between the raised and stored positions; said main bow having an intermediate portion that is located at the front edge of the opening in the hatch with the frame in the raised position; an auxiliary bow having opposite ends pivotally mounted on the main bow adjacent the opposite ends thereof; the auxiliary bow having an intermediate portion and being movable into an overcenter position with the frame in the raised position; and the convertible closure also including a soft top having a front edge secured to the intermediate portion of the main bow of the frame, a connection to the intermediate portion of the auxiliary bow, and a rear edge secured to the hatch adjacent the rear edge of the opening thereof whereby movement of the frame positions the soft top in the open or closed position.

* * * * *